Sept. 23, 1958     L. SESSEN     2,853,127
CONCENTRATION OF FOAMY LATICES
Filed March 29, 1955
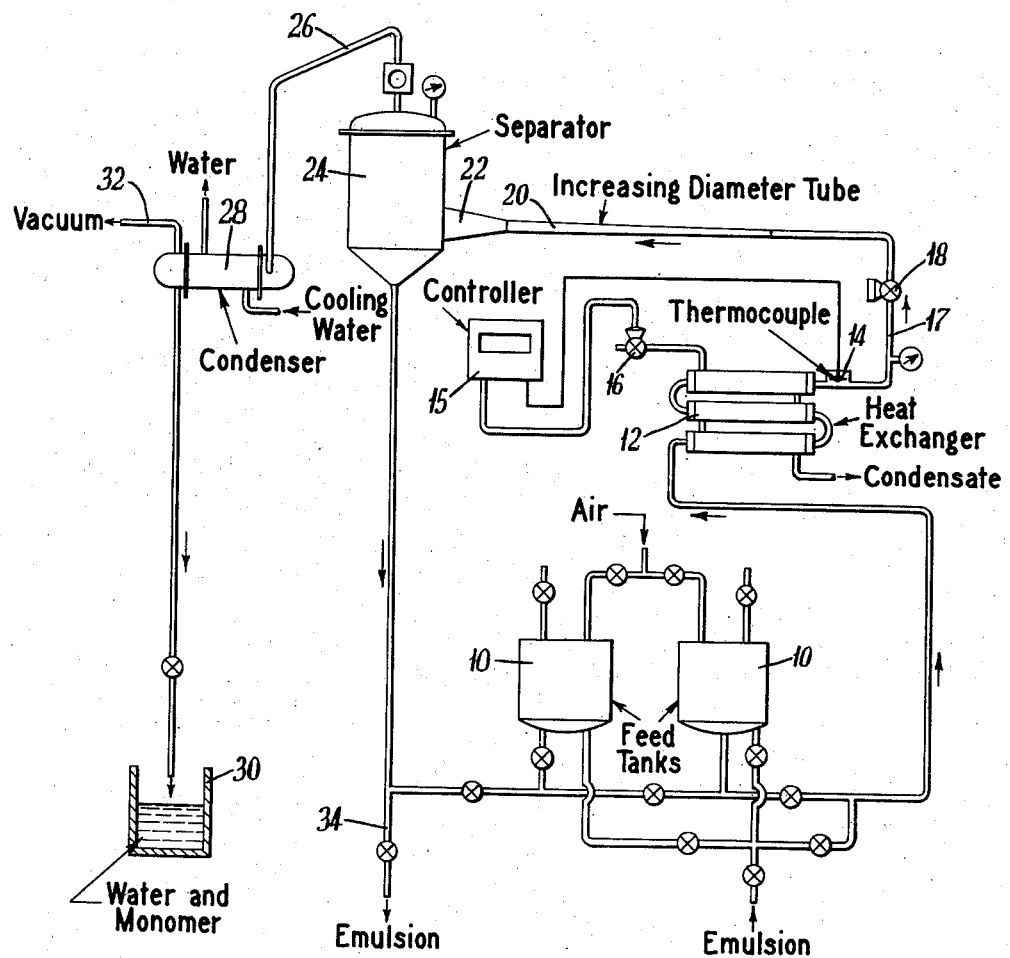
INVENTOR
LYMAN SESSEN
BY
*Richard S. Shreve*
ATTORNEY

2,853,127

CONCENTRATION OF FOAMY LATICES

Lyman Sessen, Atlantic Highlands, N. J., assignor to Union Carbide Corporation, a corporation of New York Application March 29, 1955, Serial No. 497,702

4 Claims. (Cl. 159—47)

This invention relates to concentration of foamy latices simultaneously with the recovery of excess volatile components of the emulsion and employing a continuous flow-controlled vacuum evaporator. It is particularly useful for the concentration of latices produced in the emulsion polymerization of monomeric materials. For instance, it can be effectively used to concentrate the latices produced in emulsion polymerization of styrene or vinyl acetate, or by the copolymerization of butadiene and styrene. Moreover, the concentration is effected without coagulation of the emulsion.

The invention will be described more particularly as used for the concentration of a styrene-butadiene copolymer latex. Such a latex can be prepared by polymerizing a mixture of butadiene and styrene in aqueous emulsion according to known procedures. Usually it is accomplished by mixing the two monomers in the relative proportions corresponding to the desired composition of the copolymer, adding a suitable emulsifying agent and agitating the mixture to effect emulsification. Polymerization catalysts may also be added along with other special reagents to control particle size and rate of reaction. Usually the polymerization reaction is not carried to completion and generally only up to 70 to 95 percent of the monomers used are reacted. The recovery of the unused monomers is preferably effected simultaneously with the concentration of the latex.

Conventional evaporators can not be used for the stripping and concentrating of these polymer latices due to their tendency to foam, with resultant loss of product through the vapor line, and drying out of emulsions on the sides of the vessel at the liquid level. It has been proposed to obviate this latter difficulty of means which throw a fine film of the latex on the walls of the evaporator which washes the walls continually, thus preventing the accumulation of any solid matter on them. It has also been proposed to concentrate polymer emulsions by injecting steam and latex into an externally heated tube and then passing the partially concentrated latex through a constriction into an unheated tube maintained at a pressure lower than the pressure employed during the heating step.

While such devices do, in part, eliminate the difficulties encountered in concentrating emulsions, they do not entirely eliminate coagulation of solid matter on the sides of the vessel or in the heated tubes, or the formation of foam with resultant loss of product through the vapor lines. Thus, when a heated emulsion is passed through a constriction into a vacuum the emulsion experiences a very rapid drop in pressure, becomes momentarily superheated causing water and other volatile materials to flash off thus cooling the emulsion. Because the flashing off of the volatiles is almost instantaneous, the surfaces of the bubbles first to form are considerably cooler than the surrounding emulsion, since there is sufficient time for only negligible heat transfer from the emulsion to the surface of the bubbles. Consequently, the bubbles remain small, and more and more small bubbles continue to form in the superheated emulsion. In this manner, a large amount of foam is produced composed entirely of small bubbles. Foams of this kind are very stable and difficult to break. Consequently, they fill the separators of the evaporating system and are drawn into the vapor lines resulting in considerable material loss.

The formation of such foam is avoided in this invention by so regulating the flow of the heated emulsion that instead of throttling it through a constriction, it is throttled through a long, highly polished, increasing diameter tube into a separator maintained at a high vacuum. In this way the heated emulsion experiences a gradual rate of drop in pressure rather than an instantaneous drop. Thus, the bubbles formed when vaporization begins do not remain small but continue to grow since there is sufficient time and turbulence in the flow for enough heat to transfer to the bubble surfaces to sustain vaporization. Moreover, the surrounding emulsion does not become superheated sufficiently to form a large number of new bubbles. Consequently, bubbles which form are large, unstable and easily broken with the result that foaming is, to a great extent, minimized. What foam there is, is composed of large bubbles which, if not broken by the high velocity of the latter part of the long highly polished increasing diameter tube, are easily broken in the separator of the evaporator system.

By the process provided in this invention, therefore, of effecting emulsion concentration by vaporization of the emulsion volatiles during a period of gradual pressure drop it is possible to concentrate polymer emulsions continuously with simultaneous recovery of the unreacted monomers. Foaming is readily controlled and there is no loss of material through the vapor lines. Moreover, there is no accumulation of solid matter by reason of coagulation or drying out of the emulsion during the heating stage since volatile vaporization occurs only after the emulsion has progressed past the heating stage.

In the drawing the single figure is a diagram of the evaporator equipment for carrying out the process according to the preferred embodiment of the present invention.

The emulsion to be concentrated and stripped is forced from the feed tanks 10 to a series type of a heat exchanger 12 where the emulsion is heated to a temperature below its boiling point at the pressure existing in the heat exchanger, e. g. 170° F. for a styrene 65% butadiene 35% copolymer emulsion at 0–20 p. s. i. g. The pressure in the heat exchanger is regulated by varying the throughput through the system. The temperature of the latex leaving the heat exchanger is controlled by means of a thermocouple 14 at the heat exchanger exit in conjunction with a controller 15 and control valve 16 in the steam line.

From the heat exchanger 12, the hot emulsion passes into an unheated constant diameter tube section 17 having the same diameter as the tube of the heat exchanger. The length of this unheated tube section should be such that when it conducts the normal throughput of liquid emulsion, the pressure drop that results due to liquid flow through this tube section is of such magnitude that sufficient pressure is maintained in the heat exchanger to prevent any cavitation or vaporization occurring therein. The feed tank pressure is regulated so that vaporization begins near the end or shortly beyond the end of this unheated tube section. Its function is to keep the zone of vaporization from traveling upstream in case of a drop in throughput. In general, this unheated tube is about the same length as the heat exchanger tube. Preferably, it should be constructed of glass or of a highly polished metal. In addition a pressure control valve 18 is installed in the line after the heat exchanger in order to maintain the pressure within the heat exchanger above the vapor pressure of the emulsion.

From the unheated tube 17 the hot emulsion plus a small amount of vapor passes to another unheated tube section 20 which is highly polished and preferably constructed of glass. This tube section, in which vaporization occurs, has a progressively increasing diameter and generally is as long as the unheated constant diameter tube 17. However, its length and diameter increase are dependent on the character of the emulsion, the rate of flow and the amount of volatile vaporization occurring per pass. In general, the longer the tube, the larger the bubbles, and therefore the more unstable the foam. The length required, therefore, is only that necessary to produce an unstable foam. However, the length should be sufficient to accomplish a pressure drop of less than 500 p. s. i. per second during vaporization of the emulsion. The diameter increase will depend on the throughput and the percentage of volatiles to be removed per pass. For a throughput rate of about 2000 to 3000 pounds per hour of a styrene-butadiene emulsion with a volatile removal of from 5 to 10 percent by weight of the emulsion the diameter of the highly polished tube 20 should increase from about 0.6″ I. D. to about 2″ I. D. At other rates of throughput and percent of volatile removal the cross sectional areas should be decreased or increased accordingly. Generally speaing, the exit end of the highly polished tube 20 should be from three to five times the diameter of the entering end of the tube, and the tube should be so designed that the pressure drop gradient throughout its length is substantially constant.

From the highly polished tube 20 the mixture of the emulsion and vapor passes through a short length of a funnel-shaped section of highly polished pipe 22 into the separator 24 maintained at high vacuum, about 29″ Hg. This funnel-shaped pipe 22 decelerates the high velocity flow of the vapor-emulsion mixture to a velocity of less than 100 ft./sec. This effectively prevents the concentrated emulsion from striking the walls of the separator at a velocity so high that it would tend to coagulate the emulsion. Generally speaking, a 15° to 20° funnel section having an exit diameter about three times the entrance diameter is employed.

The vapor, consisting of a mixture of unreacted monomers and water, passes off from the separator through the vapor line 26, condenses in the condenser 28 and collects in the receiver 30, and thence to the recovery system, or is drawn off through the vacuum line 32. The concentrated and stripped liquid emulsion drains out the hydraulic leg 34 to atmospheric pressure to be used as such, or, if desired, recycled and further concentrated.

I claim:

1. Process for the concentration of foamy latices which comprises heating a stream of an emulsion of constant cross section wherein it is heated to a temperature near but below its boiling point, discontinuing the application of heat to the succeeding portion of the stream and of the same cross section wherein the pressure drop leaves sufficient pressure to prevent any cavitation or vaporization occurring therein, gradually increasing the cross section of the stream while confined by a very smooth surface such that the length of the expanding path is equal to the unheated portion and its entrance to exit dimensions are in the ratio of from 1 to 3 to 1 to 5 and the pressure drop gradient throughout the length of said expanding path is substantially constant.

2. Process for the concentration of foamy latices which comprises heating a stream of an emulsion of constant cross section wherein it is heated to a temperature near but below its boiling point, discontinuing the application of heat to the succeeding portion of the stream and of the same cross section and length wherein the pressure drop leaves sufficient pressure to prevent any cavitation or vaporization occurring therein, gradually increasing the cross section of the stream while confined by a very smooth surface such that the length of the expanding path is equal to that of the unheated portion and its entrance to exit dimensions are in the ratio of from 1 to 3 to 1 to 5 and the pressure drop gradient throughout the length of said expanding path is substantially constant.

3. Process for the concentration of foamy latices which comprises heating a stream of an emulsion of constant cross section wherein it is heated to a temperature near but below its boiling point, discontinuing the application of heat to the succeeding portion of the stream and of the same cross section wherein the pressure drop leaves sufficient pressure to prevent any cavitation or vaporization occurring therein, gradually increasing the cross section of the stream while confined by a very smooth surface such that the length of the expanding path is equal to that of the unheated portion and its entrance to exit dimensions are in the ratio of from 1 to 3 to 1 to 5 and the pressure drop gradient throughout the length of said expanding path is substantially constant and less than 500 pounds per square inch per second.

4. Process for the concentration of foamy latices which comprises heating a stream of an emulsion of constant cross section wherein it is heated to a temperature near but below its boiling point, discontinuing the application of heat to the succeeding portion of the stream and of the same cross section wherein the pressure drop leaves sufficient pressure to prevent any cavitation or vaporization occurring therein, gradually increasing the cross section of the stream while confined by a very smooth surface such that the length of the expanding path is equal to that of the unheated portion and its entrance to exit dimensions are in the ratio of from 1 to 3 to 1 to 5 and the pressure drop gradient throughout the length of said expanding path is substantially constant, and delivering said stream from said expanding path into a high vacuum, whereby the material flowing experiences a constant drop in pressure and the resulting large bubble foam breaks in the high velocity of the stream downstream of the earlier part of said expanding path.

References Cited in the file of this patent

UNITED STATES PATENTS

| | | |
|---|---|---|
| 521,974 | Cooper | June 26, 1894 |
| 2,029,831 | Petersen et al. | Feb. 4, 1936 |
| 2,467,769 | Morrow et al. | Apr. 19, 1949 |
| 2,658,054 | Coleman et al. | Nov. 3, 1953 |
| 2,696,248 | Diamond | Dec. 7, 1954 |
| 2,710,057 | Bassett et al. | June 7, 1955 |